United States Patent
Singhal et al.

(10) Patent No.: US 6,272,602 B1
(45) Date of Patent: Aug. 7, 2001

(54) MULTIPROCESSING SYSTEM EMPLOYING PENDING TAGS TO MAINTAIN CACHE COHERENCE

(75) Inventors: Ashok Singhal, Redwood City; Alan Yamauchi, Saratoga; Gary Lauterbach, Los Altos, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/265,233

(22) Filed: Mar. 8, 1999

(51) Int. Cl.[7] .................................................. G06F 12/10
(52) U.S. Cl. ............................................ 711/144; 711/146
(58) Field of Search .................................. 711/141, 144, 711/146

(56) References Cited

U.S. PATENT DOCUMENTS

| | | | |
|---|---|---|---|
| 5,559,987 | * 9/1996 | Foley et al. ........................... | 711/144 |
| 5,754,877 | 5/1998 | Hagersten et al. . | |
| 5,860,100 | * 1/1999 | Feiste et al. ........................... | 711/135 |
| 5,907,583 | * 5/1999 | Jacobs et al. ........................... | 711/3 |
| 5,978,886 | * 11/1999 | Moncton et al. ...................... | 711/118 |
| 6,061,766 | * 5/2000 | Lynch et al. ........................... | 711/146 |
| 6,073,217 | * 6/2000 | Mahalingaiah et al. .............. | 711/146 |
| 6,076,147 | * 6/2000 | Lynch et al. ........................... | 711/146 |
| 6,105,112 | * 8/2000 | Arimilli et al. ........................ | 711/141 |

FOREIGN PATENT DOCUMENTS 0 735 485   10/1996   (EP) .
0 817 042   1/1998   (EP) .

OTHER PUBLICATIONS

Search Report for European Patent Application No. EP 00 30 1877, dated Jun. 23, 2000.
Charlesworth et al., "Gigaplane-XB: Extending the Ultra Enterprise Family," Jul. 30, 1997, pp. 1–16.

* cited by examiner

Primary Examiner—Matthew Kim
Assistant Examiner—Christian P. Chace
(74) Attorney, Agent, or Firm—Conley, Rose & Tayon, PC; Robert C. Kowert

(57) ABSTRACT

A pending tag system and method to maintain data coherence in a processing node during pending transactions in a transaction pipeline. A pending tag storage unit may be coupled to a cache controller and configured to store pending tags each indicative of a coherence state for a data line corresponding to a pending transaction within the transaction pipeline. The pending tag storage unit includes a total amount of storage which is substantially less than an amount required to store tags contained in the full tag array for the cache memory. When a pending tag exists in the pending tag storage unit, the coherence state of the corresponding data line within the cache memory is dictated by the pending tag for snoop operations. Accordingly, data coherence is maintained during the period when transactions are pending, e.g., not yet presented to a processor and cache. When a pending transaction is completed, the coherence state of the corresponding data line as indicated by the fill tag array may be overwritten by the coherence state as indicated by the pending tag and the pending tag may deleted from the pending tag storage.

31 Claims, 7 Drawing Sheets

MULTIPROCESSING SYSTEM EMPLOYING PENDING TAGS TO MAINTAIN CACHE COHERENCE

BACKGROUND OF THE INVENTION

1. Field of the Invention

This invention generally relates to multiprocessor computer systems that employ cache subsystems, and more specifically, to maintaining cache coherence for pending transactions.

2. Description of the Relevant Art

A processor is a device that is configured to perform an operation upon one or more operands to produce a result. The operation is performed in response to an instruction executed by the processor. A computer system includes a processor and other components such as system memory, buses, caches, and input/output (I/O) devices. Multiprocessing computer systems include two or more processors, which may be employed to perform computing tasks. A particular computing task may be performed upon one processor while other processors perform unrelated computing tasks. Alternatively, components of a particular computing task may be distributed among multiple processors to decrease the time required to perform the computing task as a whole.

A cache memory is a high-speed memory unit interposed in the memory hierarchy of a computer system between a slower system memory and a processor to improve effective memory transfer rates and accordingly improve system performance. The cache is usually implemented by semiconductor memory devices having speeds that are comparable to the speed of the processor, while the system memory utilizes a less costly, lower speed technology. The cache memory typically includes a plurality of memory locations that stores a block or a "line" of two or more words. The words may be of a variable number of bytes and may be parts of data or instruction code. Each line in the cache has associated with it an address tag that uniquely identifies the address of the line. The address tags are typically included within a tag array device. The address tag may include a part of the address bits and additional bits that are used for identifying the state of the line. Accordingly, a processor may read from or write directly into one or more lines in the cache if the lines are present in the cache and if they are valid. This event in which the processor deals directly with the cache is referred to as cache "hit". For example, when a read request originates in the processor for a new word, whether data or instruction, an address tag comparison is made to determine whether a valid copy of the requested word resides in a line of the cache memory. If present, the data is used directly from the cache, i.e. a cache read hit is completed. If not present, a line containing the requested word is retrieved from the system memory and stored in the cache memory. The requested line is simultaneously supplied to the processor. This event is referred to as a cache read miss.

Similarly, the processor may also write directly into the cache memory instead of the system memory. For example, when a write request is generated, an address tag comparison is made to determine whether the line into which data is to be written resides in the cache. If the line is present (and is valid), the data is written directly into the line. This event is referred to cache write hit. In many systems, a "dirty" bit for the line is then set. The dirty bit indicates the data stored within the line has been modified, and thus, before the line is deleted from the cache memory, overwritten, or replaced the modified data must be written into the system memory. If the line into which the data is to be written does not exist in the cache memory, the line is either fetched into the cache from the system memory to allow the data to be written into the cache, or the data is written directly into the system memory. This event is referred to as cache write miss.

In a multiprocessor system, copies of the same line of memory can be present in the caches of multiple processors. Cache coherence is the requirement that ensures that writes and reads by processors are observed by other processors in a well-defined order, in spite of the fact that each processor directly writes or reads its copy of the line in its cache. When a processor writes to a copy of the line in its cache, all other copies of the same line must either be invalidated or updated with the new value, so that subsequent reads by those other processors will observe the newly written value of the cache line. Similarly, when a processor incurs a read miss, it must be given the most recent value of the line, which could be a dirty line in another cache instead of in main memory.

Data coherence in a multiprocessor shared-memory system is typically maintained through employment of a snooping protocol or the use of a directory-based protocol. In a directory-based protocol, a directory of which processors have copies of each cache line is maintained. This directory is used to limit the number of processors that must snoop a given request for a cache line. The use of directories reduces the snoop traffic and thus allows larger systems to be built. However, use of directories increases the system's latency (which is caused by the directory lookup), hardware cost and complexity.

In a snooping protocol, each processor broadcasts all of its requests for cache lines, typically on snooping buses, to all other processors which then look up in their cache tags ("snoop") to determine what action must be taken. For example, when a processor presents a write cycle on the bus to write data into the system memory, a cache controller device of another processor determines whether a corresponding line of data is contained within the cache. If a corresponding line is not contained within the cache, the cache controller takes no additional action and the write cycle is allowed to complete. If a corresponding line of data is contained within the cache, the cache controller determines whether the line of data is modified or not, typically by looking up the entries in the tag array. If the corresponding line is not dirty (e.g., the line is in a "shared" state), the line is marked invalid and the write cycle is allowed to complete. In some systems, if the line is dirty, the processor with a dirty line must respond with a copy of the line and simultaneously invalidate its own copy (referred to as a "copyback-invalidate"). If the line is dirty, and the request is read, the processor with a dirty line must respond with a copy of the line and mark the line shared.

Accordingly, snooping reads the cache tags, and sometimes modifies the cache tags when the snooped transaction is completed. However, there are several reasons why it is often desirable to de-couple snooping from the completion of the transaction when the processors cache tags are modified.

Generally speaking, a read or write transaction may take a relatively long time to complete. Instead of completing each individual transaction before starting the next one, performance (transaction throughput) may be improved by allowing subsequent transactions to start on the broadcast snooping bus before the previous transactions have completed. Therefore, each processor may have multiple transactions (it's own read or write bus requests as well as broadcast requests from other processors) pending completion. To maintain coherence, it may be necessary to keep these pending transactions in order and therefore a Pending Transaction Queue (PTQ) may be used between the snooping bus and the processor cache. Transactions are placed in this PTQ after they have appeared on the bus and before they have been completed (completion means that they have had their desired effect on the cache).

On a large multiprocessor system, the traffic on the bus may be very heavy. Generally, only a small portion of such heavy traffic is intended for any given processor in the system, as determined by snooping. For example, requests from other processors for lines that are determined by snooping to be not present in the processor's cache are irrelevant to the processor and need not be queued in the PTQ. Accordingly, de-coupled snooping may be performed in a duplicate set of tags. In some systems, the duplicate set may be called Duplicate Tags or DTags.

The use of the DTags serves two purposes. First, since all broadcast requests need to access the snoop tags, but only the few transactions that are relevant to a processor need to access the processor's copy of the tags, the DTags help to reduce the bandwidth consumed by snooping on the processor's copy of its tags. Second, the DTags may be modified after the snoop to reflect the action of the snooped transaction, even though the transaction actually completes later when it leaves the PTQ. This allows subsequent snoops to see the modified state of the line.

Having a second tag array (DTags) for snooping is desirable if the processor cache tags are external to the processor chip and are made with the same technology as the cache data memory, since there are substantial savings in cache tag bandwidth. However, if the cache tags are on-chip in much faster memory than the off-chip cache data memory, then the cache tags may have spare bandwidth available for snooping. By performing all bus snooping to the second tag array de-coupled from the processor (first) tag array, the processor regains bandwidth that would have been lost if snooping was performed at the processor tag array. Unfortunately, the second tag array doubles the amount of memory needed for the tags. Furthermore, the second tag array increases the cost of the system since it has to be made from high-speed memory devices as the first tag array.

SUMMARY OF THE INVENTION

The problems outlined above may be solved by a pending tag array system and method in accordance with the present invention. In one embodiment, a processing node for connection to a bus, in a multiprocessor system, may include a transaction pipeline having an input to receive transactions from the bus and a processor core coupled to receive the transactions at an output of the transaction pipeline. The processing node includes a cache memory for storing a plurality of data lines, a tag array for storing a plurality of tags each indicative of an address and a coherence state for one of the plurality of data lines, and a cache controller coupled to the processor core, the bus, the cache memory, and the tag array. The cache controller may be configured to control access to the cache memory and to update the tag array. A pending tag storage unit is coupled to the cache controller and configured to store a plurality of pending tags each indicative of a coherence state for a data line corresponding to a pending transaction within the transaction pipeline. The pending tag storage unit includes a total amount of storage which is less than an amount required to store the plurality of tags contained in the tag array. When a pending tag exists in the pending tag storage unit, the coherence state of the corresponding data line within the cache memory is dictated by the pending tag for snoop operations. Accordingly, data coherence is maintained during the pending transactions even though pending transactions have not yet been presented to the processor and cache. When a pending transaction is executed, the coherence state of the corresponding data line as indicated by the tag may be overwritten by the coherence state as indicated by the pending tag and the pending tag may be deleted.

The present invention further contemplates an embodiment including a cache system to control accesses to a cache memory within a node of a multi-node computer system, wherein a processor is coupled to the cache memory and a shared bus. The cache system comprises a tag array, a pending tag storage unit, and a controller. The tag array is configured to store a plurality of tags each including an address tag and a coherence state of a data line in the cache memory. The pending tag storage unit is configured to temporarily store a pending tag in response to a transaction being presented on the shared bus which corresponds to an address tag of a particular data line (or pending data line) in the cache memory and which affects the coherence state of the particular data line. The pending tag indicates a coherence state of the particular data line as if an execution of the transaction is complete. The controller is coupled to the tag array and the pending tag storage unit. The controller is configured to determine if a given address tag exists in the tag array or pending tag storage for snoops of bus transactions. If a matching tag is found in both the tag array and the pending tag storage unit, the coherence state indicated by the tag in the pending tag storage unit is used for the snoop operation.

BRIEF DESCRIPTION OF THE DRAWINGS

Other objects and advantages of the invention will become apparent upon reading the following detailed description and upon reference to the accompanying drawings in which.

Figure 1:
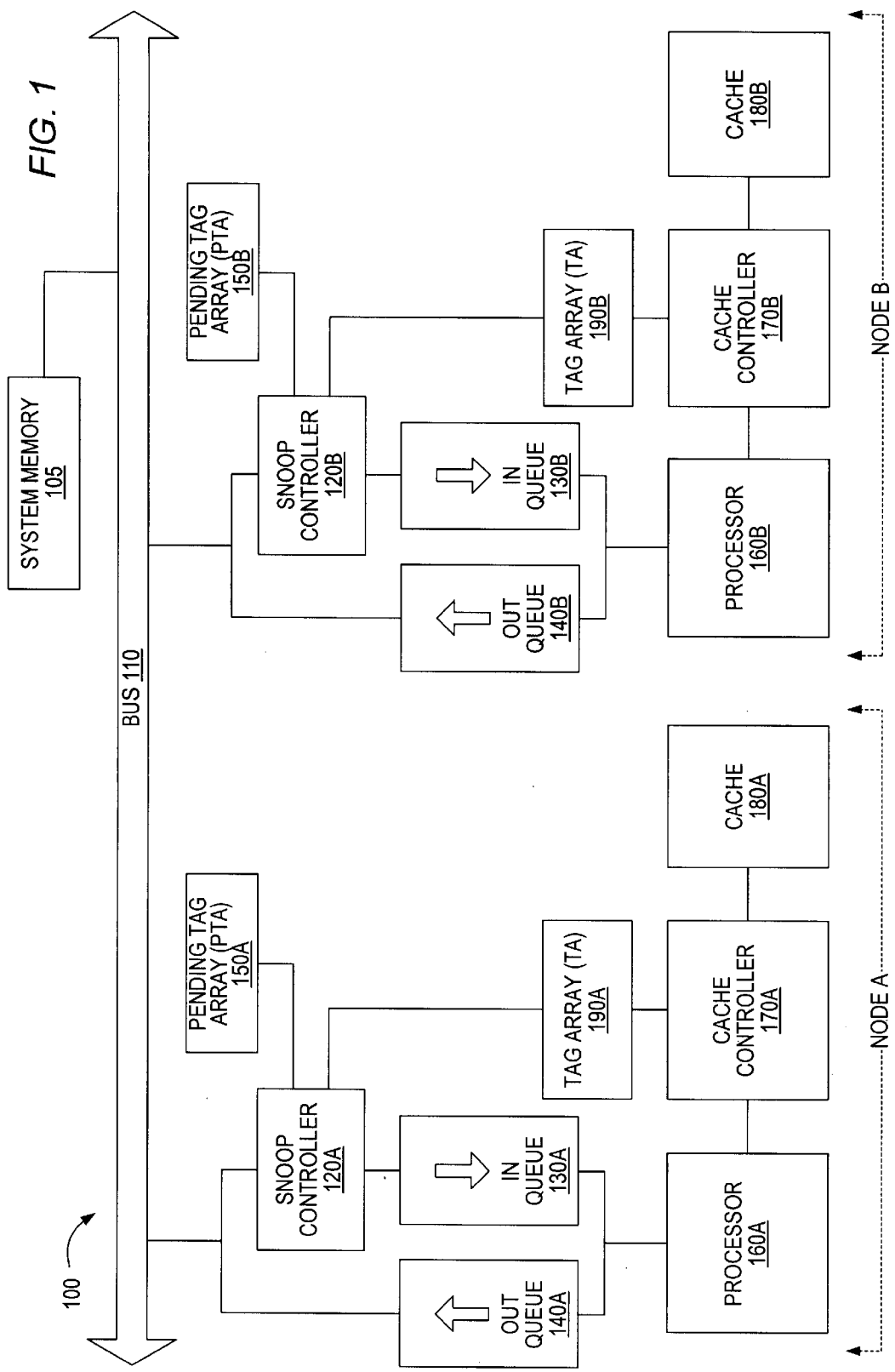
FIG. 1 is a block diagram of a computer system that maintains data coherence by employing a pending tag array.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Turning now to FIG. 1, a block diagram of a computer system 100 according to an embodiment of the present invention is shown. Computer system 100 includes two or more nodes (only two nodes are shown). Node A and node B are interconnected through a bus 110. The bus 110 may be any type of bus that would support interconnection for transactions between nodes A and B and a system memory 105 such as a system bus, a hierarchical bus, a global shared bus, and so on.

In the embodiment shown, each node includes a processor 160, an external cache 180, a cache controller 170, a snoop controller 120, a tag array (TA) 190, a pending tag array (PTA) 150, an out queue 140, and an in queue 130. Each node is interfaced to bus 110. It should be noted that node A and node B may be configured with multiple processors, caches, controllers, and queues. Generally speaking, system memory 105 is configured to store data and instructions code for use by processors 160. Various system memory architectures may be employed, such as a distributed architecture (in which memory may reside on each node) or a unified architecture. Thus, in some embodiments, the system memory 105 may be configured as a stand-alone memory or a distributed-shared memory among the nodes of the computer system 100.

It should be also noted that the components mentioned above may be grouped in various design manners for different implementations. For example, the PTA 150 and the TA 190 may be implemented within the cache controller 170. The out queue 140 and the in queue 130 may be implemented as a part of a bus interface that is used to communicate transactions into and from the node. Further, the cache controller 170 may be implemented within the bus interface. In one embodiment, cache controller 170 and tag array 190 are integrated with processor 160.

Processors 160 may be high performance processors such as a SPARC processor compliant with, e.g., version 9 of the SPARC processor architecture. It is noted, however, that any processor architecture may be employed by processors 160. Typically, processors 160 include internal instruction and data caches. Therefore, the caches 180 may be considered external or labeled as L2 caches (for level 2, wherein the internal caches are level 1 caches). If processors 160 are not configured with internal caches, then external caches 180 are level 1 caches. Alternatively, cache 180 may be an internal cache. Caches 180 provide rapid access to memory addresses frequently accessed by the processor 160 coupled thereto. It is noted that caches 180 may be configured in any of a variety of specific cache arrangements. For example, set-associative or direct-mapped configurations may be employed by caches 180.

In the embodiment of FIG. 1, two queues are shown. The in queue 130 and the out queue 140 may be viewed as a part of a transaction pipeline between the processor 160 and the bus 110. Transactions being presented on the bus 110 to be processed by the processor 160A and/or transactions that affect the coherence state of corresponding data lines within the cache 180A may be queued in the in queue 130A. Similarly, transactions being presented on the bus 110 to be presented to the processor 160B and which may affect the coherence state of corresponding data lines within the cache 180B may be queued in the in queue 130B. Transactions being initiated by processor 160A that need to be presented on the bus 110 may be queued in the out queue 140A. Similarly, transactions being initiated by processor 160B that need to be presented on the bus 110 may be queued in the out queue 140B. Accordingly, the queues 140 and 130 may act as buffers (or a part of transaction pipeline) for transaction traffic between the bus 110 and the processor 160. The latter may improve the overall performance of the computer system 100 by optimizing computational and storage resources among the nodes of the computer system 100.

A transaction that has issued on bus 110 but has not yet been presented to processor 160 and cache 180 is a "pending transaction". It should be noted that different sizes of the queues 140 and 130 may be used. An implementation of specific design depends on several factors such as, processor speed, bus transfer rate, cache and memory sizes, and the computational tasks. Further, the residence time per transaction within the queue may differ from one transaction to another, from one queue design to another, and from one computational task to another. No particular structure is required for the queues. In a general sense, the queues represent any delay or de-coupling where transaction may have been issued on bus 110 but not yet observed by processor 160 (and thus cache 180 and tag array 190). Data associated with each transaction may pass through the same or similar queues or through a different bus structure coordinated with the transactions.

The tag array (TA) 190 is used to store tags such that each corresponds to a data line within the cache memory 180. Each of the tags that are stored in the TA 190 may include an address portion (or address tag) and a coherence state portion. The address portion may refer to the address of a corresponding data line within the cache memory 180. The coherence state portion may indicate a coherence state of the corresponding data line within the cache memory 180. Accordingly, a check on a specific tag within the TA 190 provides information about both a corresponding data line within the cache memory 180 and the coherence state of the data line. For example, if a request is made to a data line, a check on the TA 190 determines if the requested data line resides within the cache memory 180. Further, if the requested data line does reside within the cache memory 180, the coherence state of the line may also be obtained from the TA 190 tag. Tag entries in TA 190 are updated after transactions exit queue 130 and are presented to processor 160.

The cache controller 170 manages the operation of the TA 190 and therefore controls the accesses to the data lines which reside within the cache memory 180. The cache controller 170 may also facilitate the data transfer or movement between the cache memory 180 and the processor 160. The snoop controller 120 performs a snooping on the bus 110 to determine if the node, where the cache controller resides, needs to know about a transaction being presented on the bus. Generally speaking, the snoop controller 120 is configured to snoop transactions being presented on the bus 110 to determine if cache coherence information needs to be updated. Both TA 190 and the pending tag array (PTA) 150 are checked for the snooping operation, as described below. The snoop controller may be any snoop controlling mechanism suitable to detect transactions being presented on the bus and to determine if and how coherence information needs to be updated or coherence action needs to be taken.

Two or more copies of a particular piece of data can exist in more than one storage location within the computer system 100. This possibility is true for all cache-based computer systems. For example, two copies of a particular piece of data may exist: of a particular piece of data may exist one in the cache memory 180 and one in the system memory 105. Further, three copies, one in the cache memory 180A, one in the cache memory 180B, and one in the system memory 105. Accordingly, maintaining data coherence is a must for the operation of cache-based computer systems. If data coherence is not maintained, incoherent copies of the data may exist, which results in incorrect results. For the purpose of maintaining data coherence, various coherence protocols may be employed by the computer system 100 depending on the complexity of the system designs for different implementations.

Various systems and notations may be used to indicate the coherence state of a particular piece of data with respect to the location where the data is stored, depending on the specific coherence protocol used. As discussed above, the coherence state of a data line is indicated by a corresponding tag that is stored within the TA 190. For the purpose of illustration, a common coherence state system is to indicate the coherence state of a copy of the data by: invalid (I), shared (S), owned (O), or modified (M) coherence states. The invalid coherence state indicates that the node does not have a valid copy of the data line of interest (thus the node does not have a copy of the data). The shared coherence state indicates that the node has a valid copy (shared copy) of the data line of interest, and other nodes may have shared copies of the data line. The owned coherence state indicates that the node has a valid copy (owned copy) of the data line of interest and other nodes may have shared copies of the data line. The modified coherence state indicates that the node is the sole owner of the data line of interest and no other shared copies of the data line exist.

Furthermore, memory operations (such as read and write transactions) may be identified by the end coherence state that results when the transaction is completed. For example, a read-to-own (RTO) transaction indicates a read request from a processor such that the processor is intending to own the copy of the data it obtained by the read request, so it can modify the copy. Also, in some protocols, a very common usage is a "dirty" bit within a tag to indicate the coherence state of a corresponding data line stored within the cache memory. The dirty line (or the dirty data line) indicates that the copy of the data stored in the data line is the most recently modified copy, and thus the only valid copy of the data line. Accordingly, if a read request is made for the dirty data line from nodes other than the node where the dirty data line is stored, the dirty copy (or the most recently modified copy) of the data must be obtained either directly from the location where it resides, or it must be copied first into the system memory then read from the system memory. It should be noted that although examples illustrating the features of the present invention may be presented using a particular memory operation (such as RTO) that may be applicable to a particular coherence protocol, the present invention is applicable to any coherence protocol that is used to maintain data coherence.

The PTA 150 is coupled to the snoop controller 120. The PTA 150 is configured to create or update a pending tag whenever the snoop controller 120 detects a transaction being presented on the bus 110 that may affect coherence for current or pending cache data. Generally speaking, if the snoop controller 120 detects a transaction being presented on the bus 110 which corresponds to a particular data line stored within the cache 180 or a data line that is pending for the cache (e.g., from an earlier transaction still pending in in-queue 130), the PTA 150 stores or updates a pending tag that corresponds to the data line if the transaction affects the coherence state of the data line. If a bus transaction does not effect any current of pending tag, the transaction may be ignored. The snoop controller checks both TA 190 and PTA 150 to determine if a transaction on bus 110 has coherence implications. Note that it is only necessary for PTA 150 to store tags for pending transactions, whereas TA 190 stores tags for all cache lines in cache 180. Thus, PTA 150 may be much smaller than TA 190.

A pending tag of the PTA 150 may include an address portion and a coherence state portion. The address portion of the PTA 150 pending tag may correspond to the address portion of a tag (or soon-to-exist tag) of the TA 190 and to a corresponding data line within the cache memory 180. The coherence state portion of a pending tag in the PTA indicates the coherence state of the corresponding data line as if an execution of the transaction has already completed at the processor. For example, if a transaction is presented on the bus and the transaction affects the coherence state of a data line within the cache memory 180 such that the coherence state of the data line will change from S to I upon execution of the transaction, the PTA 150 stores a pending tag for the to be affected data line wherein the coherence state portion of the pending tag indicates I for the data line. The PTA 150 stores pending tags that correspond to data lines within the cache memory 180 (or data lines that are already pending for cache 180) when the corresponding transactions are being presented on the bus and when these transactions are pending in the in queue 130. The tags in TA 190 are not updated until the pending transactions reach the processor 160 (and cache 180). In one embodiment, tags in TA 190 may be updated by replacement with the corresponding tag from PTA 150.

Generally speaking, the PTA 150 may store a pending tag for a transaction (that affects the coherence state of a current or pending cache data line) from presentation of the transaction on the bus 110 to completion of the transaction, i.e. during the period which the transaction is pending. Accordingly, the PTA 150 may store a pending tag a period of time that corresponds to a transition period of time with respect to the transaction. Since the number of pending transactions within a processing node is significantly smaller than the number of data lines stored within the cache memory 180, the number of pending tags within the PTA 150 may be substantially less than the number of tags within the TA 190. Advantageously, the amount of storage needed for the PTA 150 is much smaller than the amount needed for the TA 190, depending on the particular design of the processing node. Generally speaking, the PTA 150 needs a storage size that is sufficient to store a number of pending tags that is equal to the maximum possible number of pending transactions. Therefore, the PTA 150 may be any storage that enables storing of pending tags. Preferably, the PTA 150 is fully associative; however, other storage arrangements are possible. Although referred to as an array for convenience, any memory structure may be used for the PTA.

When a pending tag exists in the PTA 150 for a data line within the cache memory 180, a pending transaction also exists (somewhere in the transaction pipeline, such as within the in queue 130), and the coherence state that is indicated by the pending tag dictates the coherence state of that data line for snooping purposes. Accordingly, for snooping, the coherence state of the data line as indicated by the pending tag is used instead of the coherence state of the data line that is indicated by the tag stored within the TA 190 during the period when the transaction is pending. Eventually, the pending transaction is outputted from the transaction pipeline (such as from the in queue 130) and presented at the processor. When the pending transaction is presented at the processor and the execution of the transaction is completed, the coherence state as indicated by the pending tag (for the corresponding data line) may overwrite the coherence state that is indicated by the tag within the TA 190 for the corresponding data line and the pending tag may be deleted from the PTA 150. Accordingly, the coherence state that is stored in the TA 190 for the corresponding data line is updated with the coherence state that was stored in the PTA 150. The updating operation may be performed by the cache controller 170. Since the pending tag dictates the coherence state of the pending transaction, data coherence is maintained for subsequent transactions. If no pending tag exists for a particular data line within the cache memory 180, the coherence state of the particular data line is dictated by the tag within the TA 190 that corresponds to the particular data line. To further illustrate the present invention, a detailed example will be provided below with the aid of FIGS. 2, 3, 4, and 4A. FIGS. 2, 3, 4, and 4A provide illustrations of a particular example of the pending tag array 150 operation according to the embodiment of FIG. 1.

Figure 2:
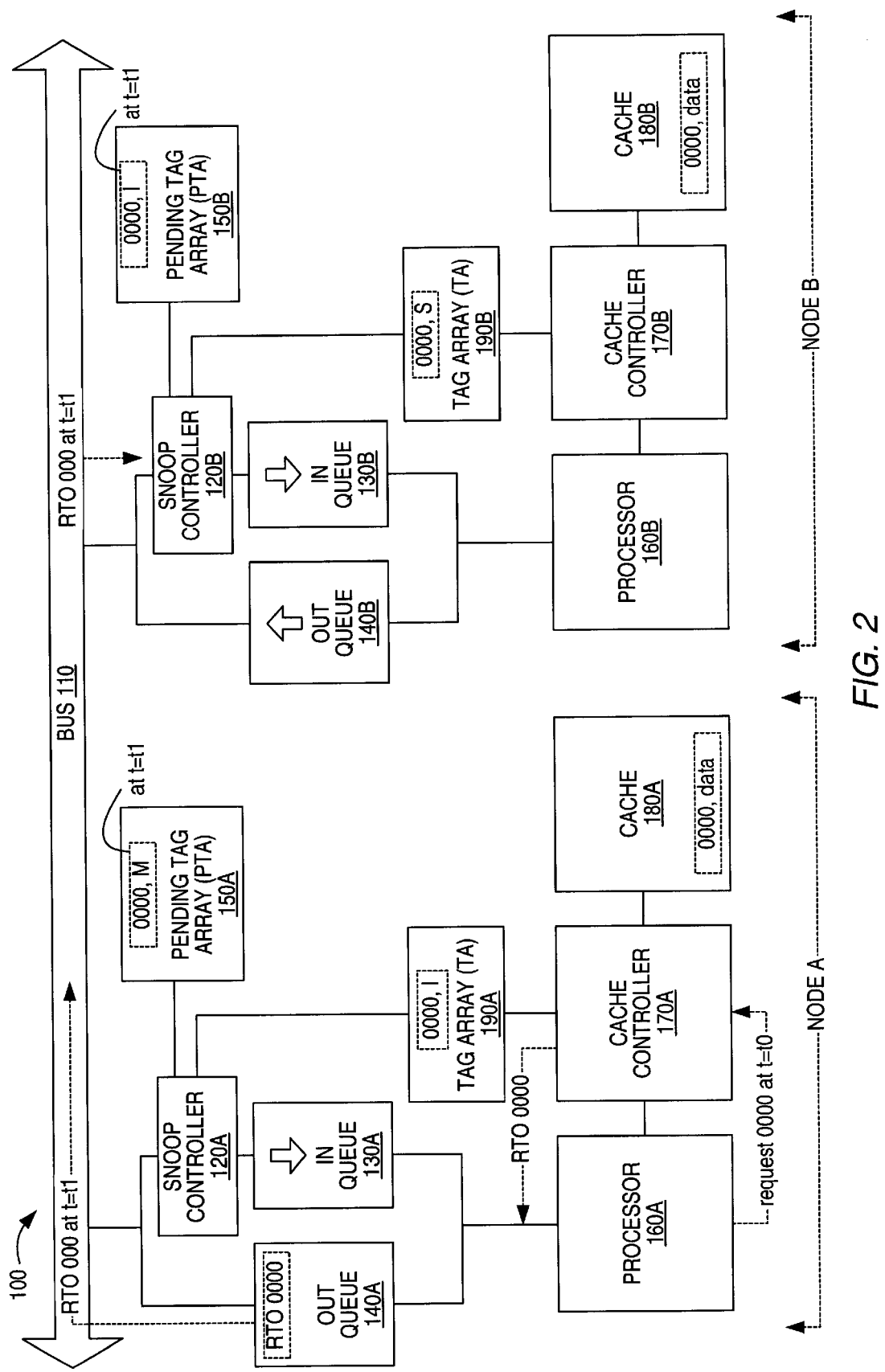
FIG. 2 is an illustration of an example for performing data coherence in the computer system of FIG. 1 employing the pending tag array.

Turning now to FIG. 2, the processor 160A (node A) attempts to write data into a line identified by the address 0000 at t=t0. The cache controller 170A receives the write request that is initiated by the processor 160A. The cache controller 170A checks the TA 190A to determine if the requested data line exists within the cache memory 180A. The cache controller 170A determines that a tag 0000 exists in the TA 190A, however, the tag 0000 indicates that the coherence state of the data line is I (invalid). Thus, node A does not have a copy of the data and, depending on the cache architecture, it may need to obtain a copy of the data prior to executing the write transaction. To obtain a copy of the data, a read-to-own (RTO) transaction may be issued on the bus 110 for address 0000. The RTO transaction indicates the processor 160A's intention to copy the address 0000 data into its cache memory 180A and to write into the address 0000 within its cache memory 180A, in order to modify the data.

The RTO for address 0000 (RTO 0000) is entered into the out queue 140A, where it may be delayed depending on the number of entries within the out queue 140A, availability of the bus, etc. Eventually, the RTO transaction for address 0000 is presented on the bus 110 (at time t=t1). Once the RTO 0000 is outputted from the out queue 140A and presented on the bus 110 (at t=t1), the snoop controller 120A stores a pending tag 0000 within the PTA 150A. In one embodiment, the stored pending tag 0000 indicates that the coherence state for the 0000 location is M (since it will be modified) even though the RTO 0000 has not yet completed. Accordingly, the stored pending tag 0000 indicates a coherence state for address 0000 as if the RTO (and associated write) has actually been completed. In this case it is, as if the processor 160A has become the owner of the address 0000. Thus, to the bus and other nodes, processor 160A is the owner of a modified copy of the data in the address 0000. The RTO 0000 is then entered into the in queue 130A awaiting the arrival of data to complete the transaction.

Furthermore, once the RTO 0000 is presented on the bus 110 (at t=t1) the snoop controller 120B (node B) detects the RTO 0000 transaction on the bus 110. The snoop controller 120B (node B) determines if this RTO 0000 transaction affects a data line within its cache memory 180B (or pending for its cache) by checking TA 190B and PTA 150B. For this example, the cache memory 180B contains a data line that is identified by the address 0000. Thus, the cache controller 170B finds a tag 0000 within the TA 190B indicating that the address 0000 resides within the cache memory 180B (assume no 0000 tag in PTA 150B). Further, the tag 0000 indicates a coherence state S (shared) for the data line 0000 within its cache memory 180B. Since the RTO 0000 on the bus 110 affects the address 0000 within the cache memory 180B (when the RTO 0000 transaction is completed), the snoop controller 120B stores a pending tag 0000 within the PTA 150B. The stored pending tag 0000 indicates that the coherence state of the address 0000, within the cache memory 180B, is I (invalid) even though the RTO 0000 has not yet been completed in node A. Accordingly, the stored pending tag 0000 in PTA 150B indicates a coherence state for address 0000 as if the RTO has actually been completed in node A. The RTO 0000 is then entered into the in queue 130B, so that the cache controller 170B can eventually perform the invalidation of line 0000 in its cache when the RTO 0000 reaches the head of the queue 130B.

Figure 3:
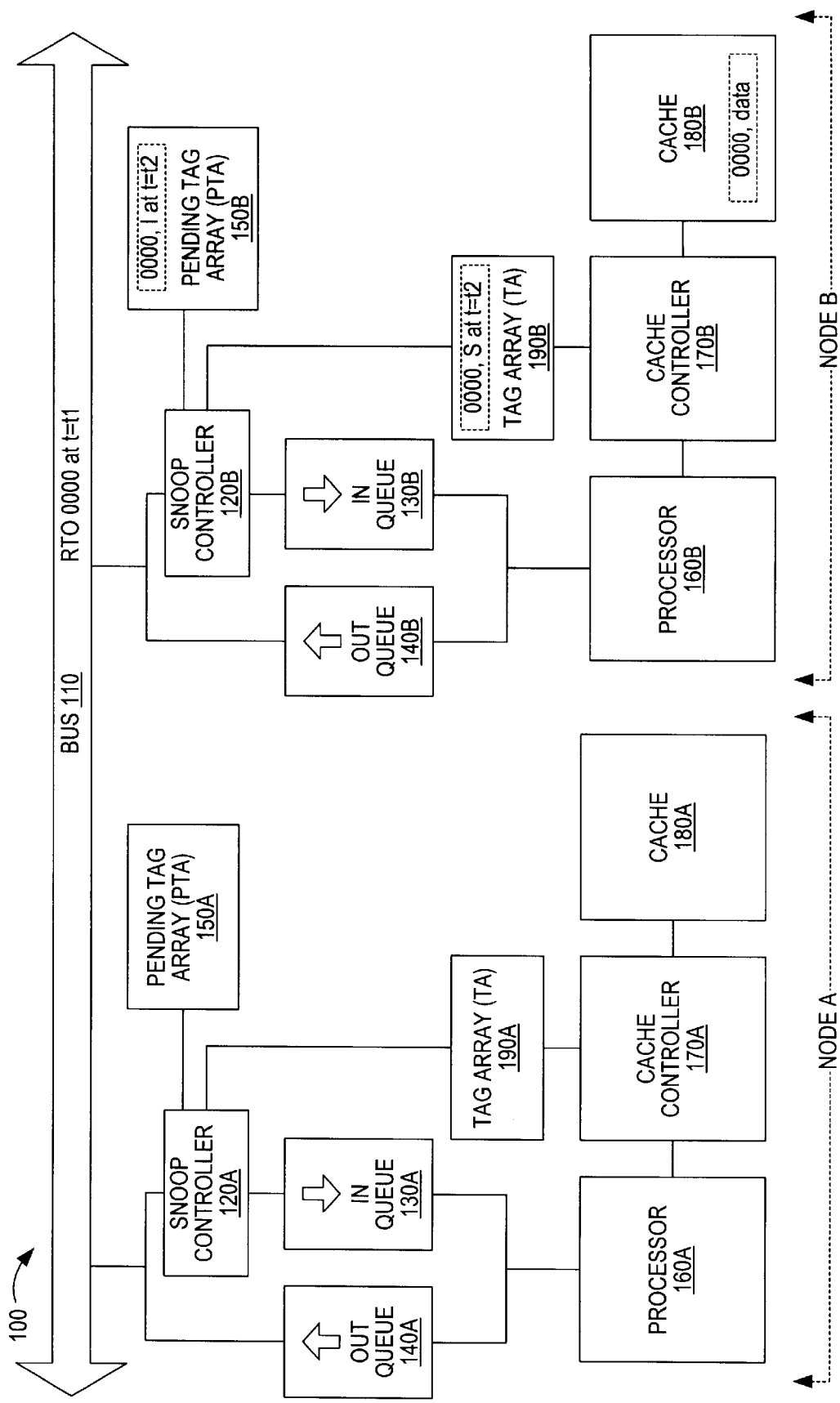
FIG. 3 is an illustration of another example for performing data coherence in the computer system of FIG. 1 employing the pending tag array.

Turning now to FIG. 3, at time t=t2, such that t2>t1, but before the RTO 0000 (that was issued by node A) is completed (assume that RTO 0000 is to be completed at t=t4, where t4>t2), processor 160B attempts to write into the address 0000 within its cache memory 180B. The cache controller 170B receives the write request that is initiated by the processor 160B. The cache controller 170B checks the TA 190B to determine if the requested data line exists within the cache memory 180B. The cache controller 170B determines that a tag 0000 exists in the TA 190B, which indicates that the requested data line (address 0000) resides within the cache memory 180B. The tag 0000 indicates that the coherence state of the data line is S (shared). The tag 0000 in the TA 190B indicates that the coherence state of address 0000 in node B is S, which does not allow a write operation to be performed without first invalidating other copies. The processor 160B (or the cache controller 170B) then issues a RTO transaction on the bus for address 0000. Thus, node B does not have a copy of the data and it must obtain a copy of the data prior to executing the write transaction. The processor 160B (or the cache controller 170B) then issues a RTO transaction on the bus 110 for address 0000.

Figure 4:
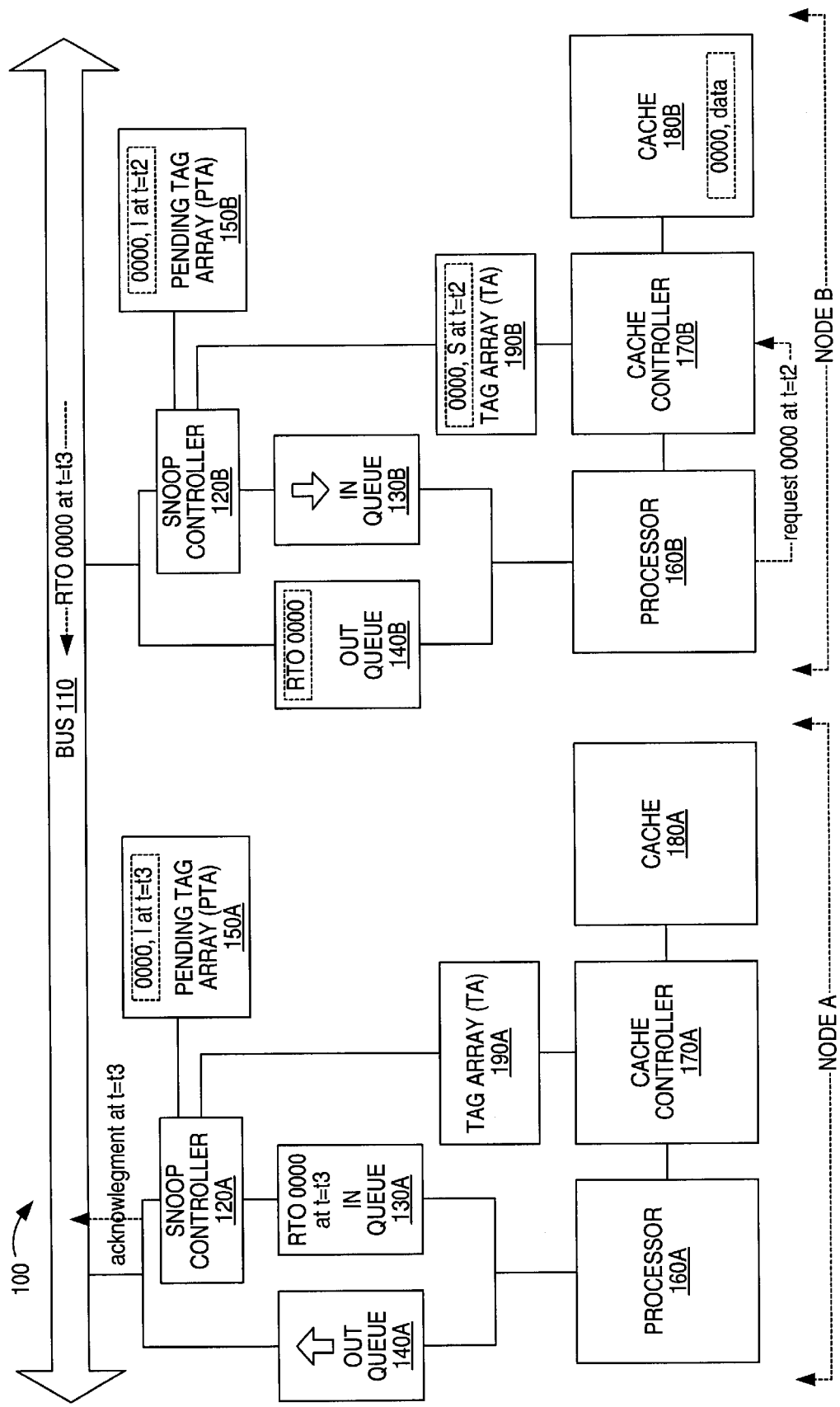
FIG. 4 is an illustration of still another example for performing data coherence in the computer system of FIG. 1 employing the pending tag array.

Turning now to FIG. 4, the second RTO for the same address 0000 by Node B (RTO 0000 $2^{nd}$) is entered into the out queue 140B, where it may be delayed depending on the number of entries within the out queue 140B, etc. Eventually, the RTO 0000 $2^{nd}$ is presented on the bus 110 (at time t=t3, where t3<t4). Once the RTO 0000 $2^{nd}$ is presented on the bus 110, the snoop controller 120A detects the RTO 0000 $2^{nd}$ transaction on the bus 110. The cache controller 120A (node A) determines if this RTO 0000 $2^{nd}$ transaction affects a data line within its cache memory 180A. The cache controller 170A finds the tag 0000 within the TA 190A indicating that the address 0000 resides within the cache memory 180A, and the tag 0000 indicates that the address 0000 is I. However, the PTA 150A indicates that the coherence state of the address 0000 within the cache memory 180A is M. Thus, node A will have to acknowledge that it is the owner of modified data for the address 0000 and prepare to send the modified data for address 0000 (upon completion of the first RTO 0000 and write) to node B in response to the second RTO 0000 even though Node A does not have the data for address 0000 yet in response to its (first) RTO 0000. Snoop controller 120A also at this time updates the pending tag 0000 to indicate a coherence state of I. Alternatively, a new pending tag for 0000 may be stored in PTA 150A indicating an I coherence state for 0000. If a new pending tag is created, some indication that it is the most recent pending tag for 0000 may be necessary so that snooping will be performed correctly for subsequent transactions. If the existing pending tag 0000 is updated to 1, it may be necessary to ensure that the pending tag is not deleted until all pending transactions for 0000 have been completed. Also, when the second RTO is presented on bus 110, cache controller 170B will create a pending tag entry in PTA 150B indicating a modified state, since for subsequent transaction node B will be the owner of 0000.

Figure 4A:
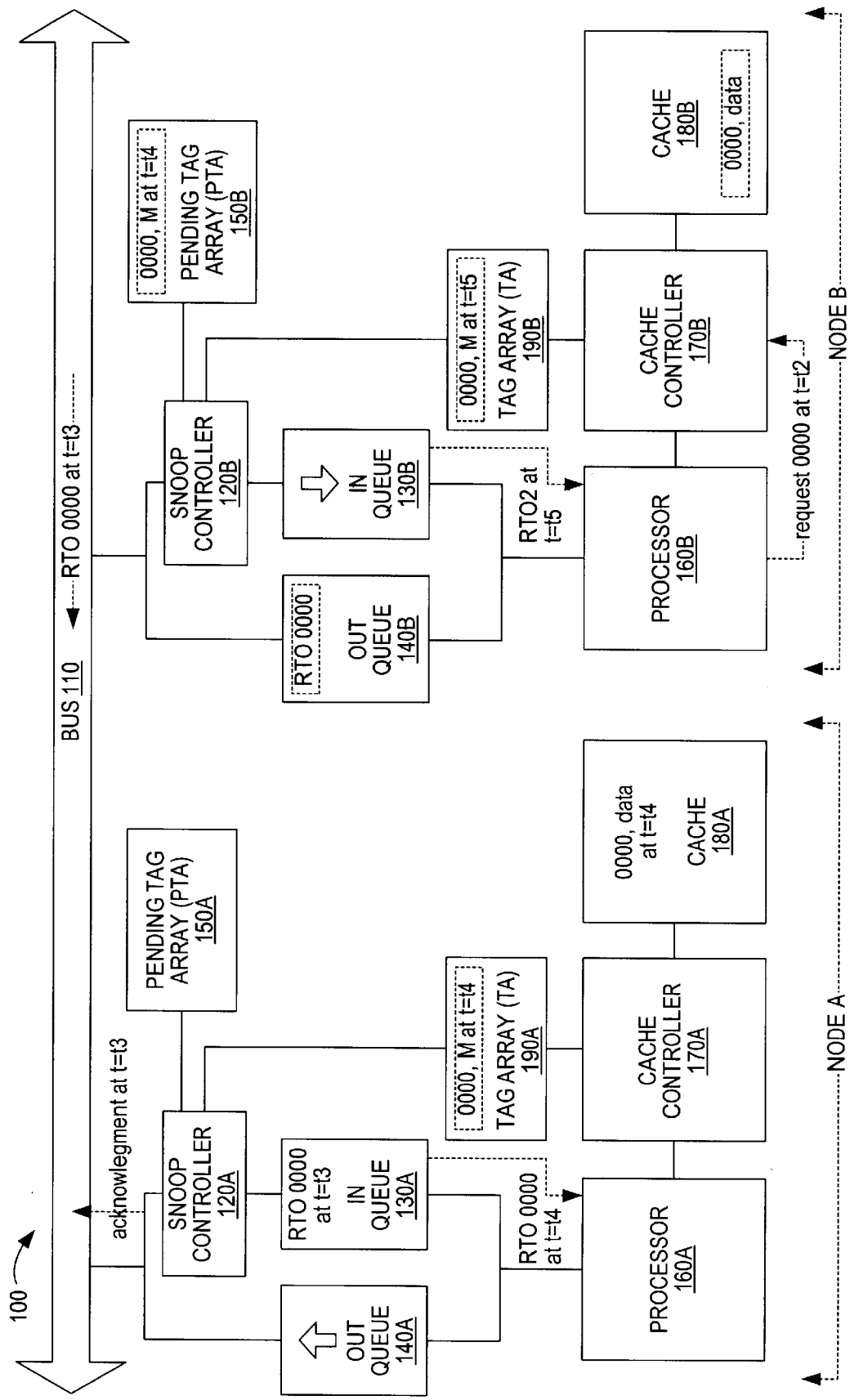
FIG. 4A is an illustration of still another example for performing data coherence in the computer system of FIG. 1 employing the pending tag array.

Turning now to FIG. 4A, at time t=t4 such that t4>t3, the first RTO completes in node A and data for address 0000 is stored in cache 180A. The write from processor 160A that initiated the first RTO may also be completed. Accordingly, the coherence state of the tag 0000 in TA 190A is changed from I to M. If separate entries were made in the PTA 150A for the two transactions affecting 0000, then the first pending tag (which indicates a M state) is deleted from the PTA 150A. If only one pending tag exists for 0000 (updated to now indicate a coherence state of I), the pending tag must be kept in the PTA 150A until the second RTO completes. When the RTO reaches the head of the in queue 130B in node B, the 0000 tag in TA 190B is changed from S to I by the cache controller 170B.

At t=t5, such that t5>t4, the second RTO completes at processor 160A and a copy of the data (i.e. the last modified copy) within the address 0000 in node A is transmitted to node B (or to the system memory and to the node B) in response to the second RTO 0000. Accordingly, the coherence state for 0000 in the cache memory 180B is set to M in the tag within the TA 190B and set to I for the 0000 tag in tag array 190A.

Figure 5:
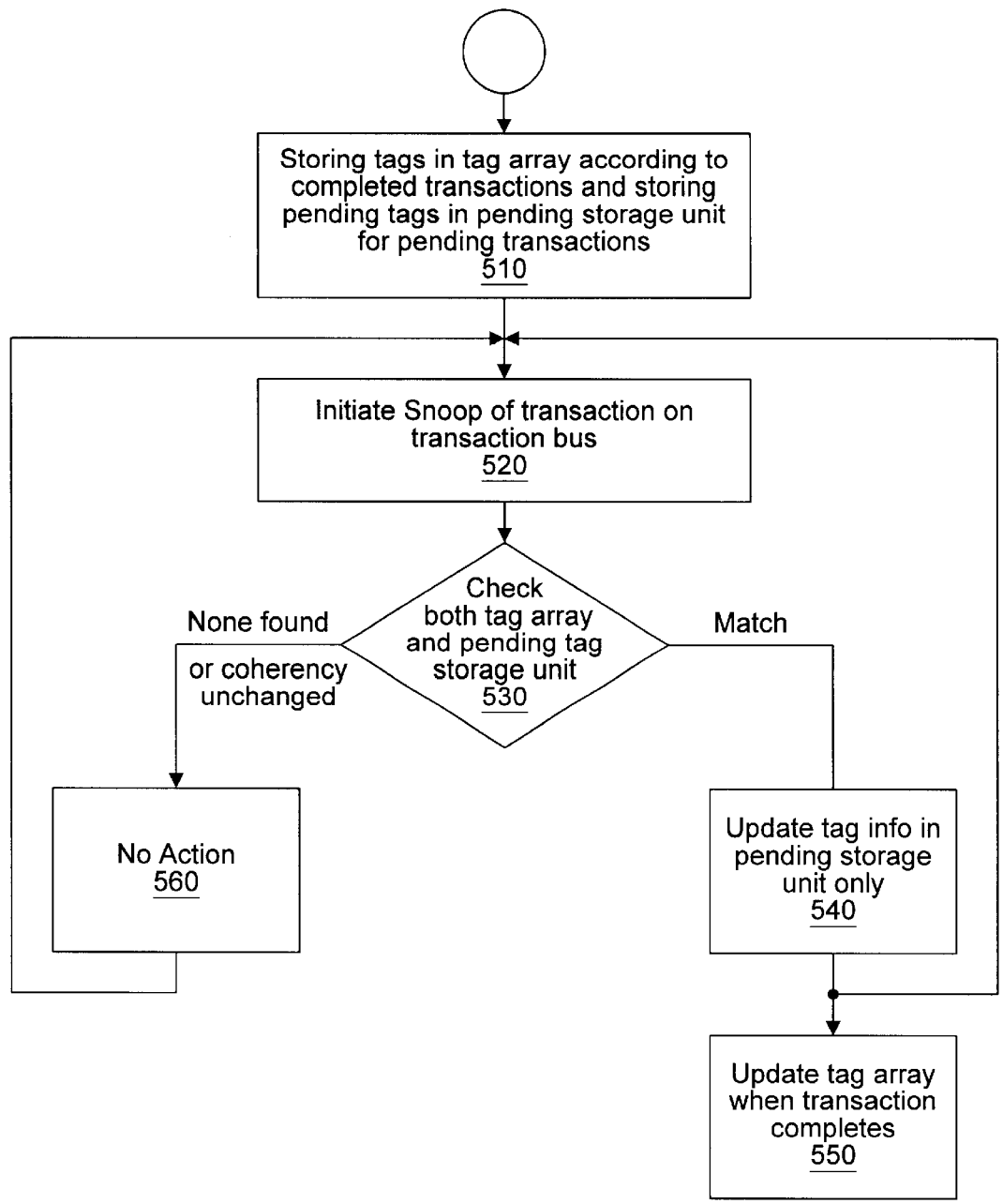
FIG. 5 is a flow chart diagram for a method to maintain data coherence using a pending tag array during snoops of bus transactions.

Turning now to FIG. 5, a flow chart diagram is shown for a method to maintain data coherence using a pending tag storage unit to indicate cache coherence information for uncompleted transactions. As indicated at 510, tags are stored within a tag array for a plurality of data lines within the cache memory according to transactions that have completed. Each tag within the tag array (which corresponds to a data line) indicates an address and a coherence state of the corresponding data line. Pending tags are stored in a pending tag storage unit for transactions that have not yet completed. As indicated at 520, snooping is performed on the bus to determine if a transaction is being presented on the bus that affects a particular data line within the cache memory or that is pending for the cache memory. A snoop controller or a cache controller may perform the snooping. As indicated at 530, the snooping operation checks tag entries in both the pending tag storage unit and the tag array. If the transaction on the bus does not affect a tag in either location, no action is taken, as indicated at 560. If the transaction on the bus does affect a particular tag within the pending tag storage unit or the tag array, a pending tag storage unit is updated contain a pending tag reflecting coherence as if the transaction had completed, as indicated at 540. If no corresponding tag existed in the pending storage unit (e.g., a corresponding tag was in the tag array only), a new pending tag entry is created in the pending storage array. If a corresponding pending tag entry was found only in the pending tag storage unit or in both the pending tag storage unit and the tag array, either a new pending tag is created or the existing one is updated. Regardless of which method is used in the pending tag storage unit, the coherence is updated according to the pending tag, not the tag in the tag array. The pending tag indicates a coherence state for the data line as if the transaction has been completed. The completion of the transaction may be delayed anywhere in a transaction pipeline such as an in queue. As indicated at 550, when the transaction completes, the corresponding tag in the tag array is updated.

Figure 6:
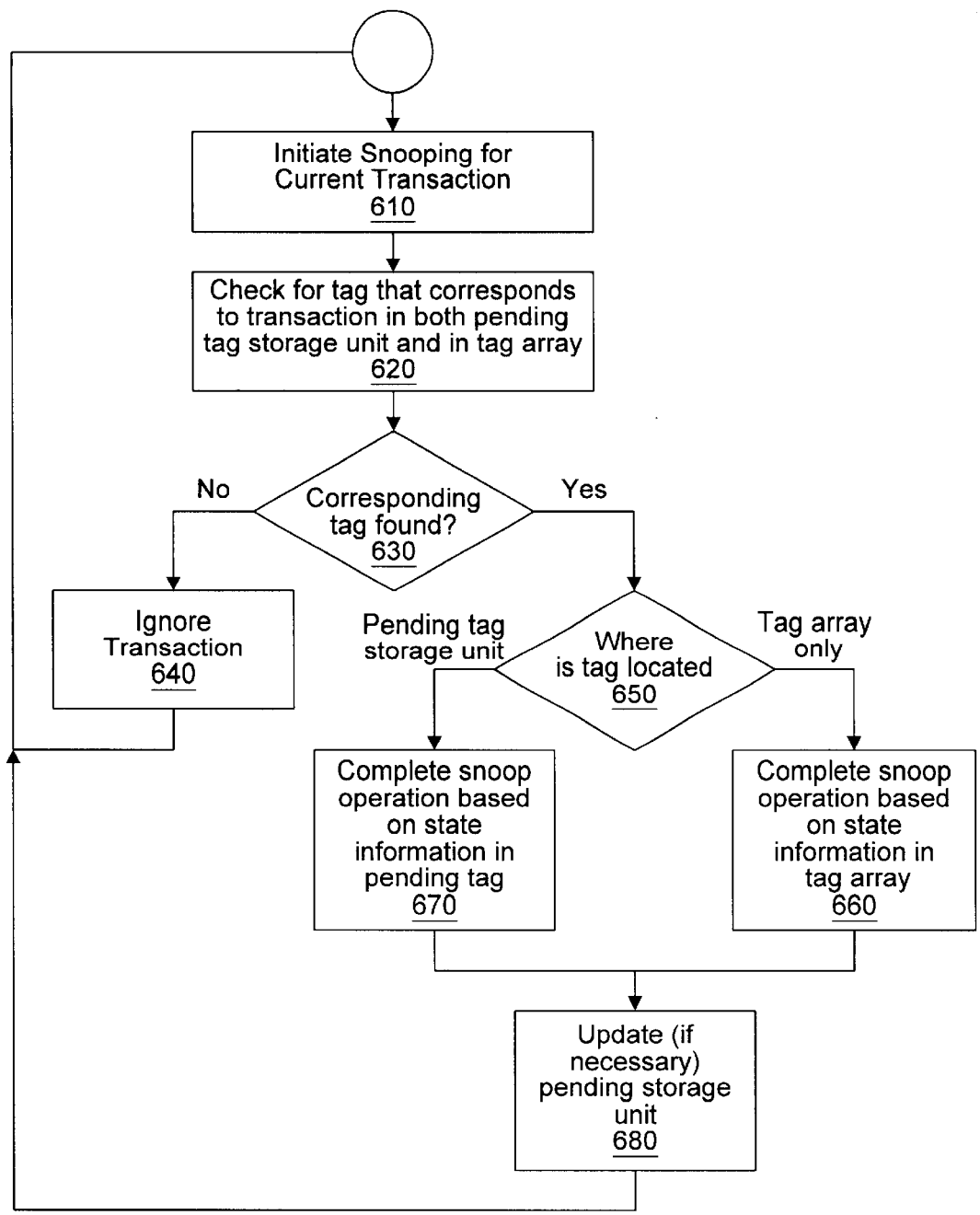
FIG. 6 is a flow chart diagram for a snooping method to maintain data coherence using the pending tag array during transactions being presented on a bus that may affect the coherence state of data lines within a cache memory or pending for the cache memory.

Turning now to FIG. 6, a flow chart diagram is shown for a method of snooping to maintain data coherence using a pending tag array storage unit. A transaction bus (which may be a transaction bus linking processor nodes in a multiprocessor system) is snooped to determine if a current transaction affects cache coherence for a processor node, as indicated at 610. A pending tag storage unit and a tag array are both checked to determine if the current transaction has coherence implications for the processor node, as indicated at 620. The tag array stores information corresponding to each data line stored in a cache memory coupled to a processor. Each tag in the tag array may indicate address and coherence state information for its corresponding cache line. If no tag corresponding to the current transaction is found in either the pending tag storage unit or the tag array, then the transaction may be ignored for snooping purposes, as indicated at 630 and 640. If a tag corresponding to the transaction is found, then the snoop operation continues according to where the matching tag was found. If the corresponding tag was found in the pending storage unit, then the snoop is performed using the coherence state indicated by the pending tag stored in the pending tag storage unit even if a matching tag was also found in the tag array, as indicated at 650 and 670. If the corresponding tag is found only in the tag array, then the snoop proceeds according to the coherence state information indicated by that tag, as indicated at 650 and 660. If the current transaction indicates a change in the coherence state, then the pending tag storage unit is updated (by either a new entry or by updating an existing pending tag that corresponds to the transaction), as indicated at 680. Note that the tag array is not updated at this time (while the transaction is pending). The tag array is not updated until the transaction completes, at which time the pending tag may be deleted in the pending storage unit.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:

1. A processing node for connection to a transaction bus in a multiprocessor system, said processing node comprising:

a transaction pipeline having an input to receive transactions from said transaction bus;

a processor core coupled to receive said transactions output from said transaction pipeline;

a cache memory for storing a plurality of data lines, wherein said cache memory is coupled to said processor core;

a tag array for storing a plurality of tags each comprising address information and a coherence state for one of said plurality of data lines in said cache memory;

a cache controller coupled to said processor core, to said transaction bus, to said cache memory, and to said tag array, wherein said cache controller is configured to manage access to said cache memory and to update said tag array;

a pending tag storage unit coupled to said cache controller and configured to store a plurality of pending tags each indicative of a coherence state for a data line corresponding to a pending transaction within said transaction pipeline, wherein said pending tag storage unit includes a total amount of storage which is less than an amount required to store said plurality of tags contained in said tag array.

2. The processing node as recited in claim 1, wherein said pending tag storage unit is configured to store only pending tags corresponding to pending transactions.

3. The processing node as recited in claim 1, wherein said cache controller is configured to snoop transactions on said transaction bus to determine if a transaction on said transaction bus affects the coherence state indicated by one of said tags or one of said pending tags.

4. The processing node as recited in claim 1, wherein said tag array is set associative, and wherein said pending tag storage unit is fully associative.

5. The processing node as recited in claim 1, wherein said cache controller determines the coherence state according to a current transaction on said transaction bus based on the coherence state indicated by one of said pending tags stored in said pending tag storage unit when said current transaction corresponds to said one of said pending tags.

6. The processing node as recited in claim 1, wherein said cache controller determines the coherence state according to a current transaction on said transaction bus based on the coherence state indicated by of one of said tags stored in said tag array when said current transaction corresponds to said one of said tags and no corresponding pending tag is present in said pending tag storage unit.

7. The processing node as recited in claim 1, wherein a pending tag is created or updated in said pending tag storage unit for each transaction on said transaction bus that affects the coherence state indicated by one of said pending tags stored in said pending tag storage unit or one of said tags stored in said tag array according to tags in both said tag array and said pending tag storage unit.

8. The processing node as recited in claim 1, wherein each one of said pending tags corresponds to a pending transaction in said transaction pipeline, and wherein the each one of said pending tags indicates the coherence state as if its corresponding pending transaction has completed.

9. The processing node as recited in claim 1, wherein a transaction that is received from said bus is entered into said transaction pipeline and a corresponding pending tag is stored in said pending tag storage unit.

10. The processing node as recited in claim 9, wherein said pending tag that is stored in said pending tag storage unit upon receiving said transaction from said bus is deleted from said pending tag storage unit as said transaction is outputted from said transaction pipeline to said processor core.

11. The processing node as recited in claim 10, wherein a coherence state indicated by one of said tags stored within said tag array is updated with the coherence state indicated by the corresponding pending tag as said transaction is outputted from said transaction pipeline to said processor core.

12. A cache system within a node of a multi-node computer system, wherein a processor is coupled to said cache system and to a bus between nodes, said cache system comprising:
 a tag array configured to store a tag including an address and a coherence state for each data line in a cache memory;
 a pending tag storage unit configured to store a pending tag in response to a transaction being presented on said bus which affects the coherence state for a current cache data line or a transaction pending in the node according to tags in both said tag array and said pending tag storage unit; and
 a controller coupled to said tag array and said pending tag storage unit, wherein said controller is configured to snoop transactions on said bus according to tags in both said tag array and said pending tag storage unit.

13. The cache system as recited in claim 12, wherein said pending tag indicates a coherence state as if said transaction is complete.

14. The cache system as recited in claim 12, wherein if a pending tag exists within said pending tag storage unit that corresponds to a transaction being snooped on said bus, a coherence state contained in said corresponding pending tag is used for said snooping regardless of if a corresponding tag exists in said tag array.

15. The cache system as recited in claim 14, wherein if said tag corresponding to the snooped transaction exists within said tag array and no corresponding pending tag exists within said pending tag storage unit, a coherence state contained in said tag array tag is used for said snooping.

16. The cache system as recited in claim 12, wherein the snooped transaction is ignored if no tag in said pending tag storage unit or in said tag array corresponds to the snooped transaction.

17. A computer system comprising:
 a processor coupled to a bus;
 a cache memory; and
 a cache controller system coupled to said processor and said cache memory, wherein said cache controller system comprises:
  a tag array configured to store a plurality of tags each including an address and a coherence state for a data line in said cache memory,
  a pending tag storage unit configured to store a pending tag in response to a transaction being presented on said bus which corresponds to a particular data line in said cache memory and which will affect the coherence state for said particular data line when the transaction is completed, and
  a control unit coupled to said tag array and said pending tag storage unit, wherein said control unit is configured to determine if a tag exists in said tag array having an address corresponding to a transaction present on said bus and to determine if a pending tag exists in said pending tag storage unit having an address corresponding to said transaction present on said bus.

18. The computer system as recited in claim 17, wherein said pending tag indicates a coherence state as if the transaction is complete.

19. The computer system as recited in claim 17, wherein said pending tag storage unit is further configured to store a pending tag or update an existing pending tag in response to a transaction being presented on said bus which corresponds to the existing pending tag.

20. The computer system as recited in claim 17, wherein said controller is further configured to perform a snoop operation to update coherence state information if said controller determines a tag or pending tag exists that corresponds to a transaction on said bus.

21. The computer system as recited in claim 20, wherein if a corresponding tag exists within said tag array and a corresponding pending tag also exists within said pending tag storage unit, the coherence state contained in said pending tag is used for said snoop operation.

22. A cache coherence method for a computer system having at least two nodes coupled by a transaction bus for communicating transactions between nodes, wherein a transaction on said transaction bus becomes a pending transaction in a node before completing in the node, wherein at least one node has a processor and cache memory, and wherein said cache memory comprises a plurality of cache lines, the method comprising:

storing tags in a tag array, wherein each tag indicates coherence information for a cache line according to completed transactions;

storing pending tags in a pending tag storage unit, wherein each pending tag indicates coherence information for a cache line according to a pending transaction; and snooping a current transaction on the transaction bus, wherein said snooping comprises:
checking said tags and said pending tags for a tag that corresponds to said current transaction; and
if a corresponding tag or pending tag is found by said checking, updating said pending tags.

23. The method as recited in claim 22, wherein said updating comprises creating a new pending tag or modifying the coherence information indicated by an existing pending tag.

24. The method as recited in claim 22, wherein said pending tags indicate coherence information as if a corresponding transaction is complete.

25. The method as recited in claim 22, wherein said tags are not updated until a transaction completes.

26. The method as recited in claim 22, wherein if a corresponding tag or pending tag is found by said checking, using the coherence information indicated by the corresponding tag or pending tag for said updating, wherein if both a tag and a pending tag are found, then using the coherence information indicated by the corresponding pending tag for said updating.

27. A method for snooping bus transactions in a computer system having at least two nodes coupled by a transaction bus, the method comprising:

in response to a current transaction on the transaction bus, checking for a tag that corresponds to the current transaction in both a tag array and a pending tag storage unit, wherein said tag array stores tags indicating coherence information for cycles that have completed in a node and said pending tag storage unit stores tags indicating coherence information according to cycles that have not completed in the node;

if a tag corresponding to the current transaction is found at said checking, using coherence information indicated by the corresponding tag to determine if coherence information needs to be updated; and updating the coherence information in the pending tag storage unit if necessary as determined at said using.

28. The method as recited in claim 27, wherein if both said tag array and said pending tag storage unit contain a corresponding tag at said checking, the corresponding tag from said pending tag storage unit is used for said using.

29. The method as recited in claim 27, wherein said tag array is configured to store a tag indicating coherence information for each cache line of a cache memory, and wherein said pending tag storage unit is configured to store tags indicating coherence information according to pending transactions only.

30. The method as recited in claim 27, wherein the maximum number of tags stored by said pending tag storage unit equals the maximum number of transactions that have not completed in the node.

31. The method as recited in claim 27, further comprising deleting a tag from said pending tag storage unit when a transaction corresponding to that tag completes.

* * * * *